United States Patent
Mayer et al.

(10) Patent No.: US 7,319,546 B2
(45) Date of Patent: Jan. 15, 2008

(54) COLOR MANAGEMENT METHOD

(75) Inventors: Martin Mayer, Ladenburg (DE); Nikolaus Pfeiffer, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 11/265,863

(22) Filed: Nov. 3, 2005

(65) Prior Publication Data

US 2006/0055949 A1    Mar. 16, 2006

Related U.S. Application Data

(62) Division of application No. 09/739,518, filed on Dec. 15, 2000, now Pat. No. 7,009,732.

(30) Foreign Application Priority Data

Dec. 15, 1999   (DE)   ............................... 199 60 675

(51) Int. Cl.
    *G06F 15/00*    (2006.01)
(52) U.S. Cl. .................. 358/1.9; 358/474; 358/448; 358/524; 358/518; 358/519; 358/504
(58) Field of Classification Search ................ 358/1.9, 358/448, 524, 518, 519, 504, 474
    See application file for complete search history.

(56) References Cited

U.S. PATENT DOCUMENTS

| | | | |
|---|---|---|---|
| 5,107,332 A * | 4/1992 | Chan | ........................ 358/518 |
| 5,450,216 A | 9/1995 | Kasson | |
| 5,552,904 A | 9/1996 | Ryoo et al. | |
| 5,553,199 A | 9/1996 | Spaulding et al. | |
| 5,760,913 A * | 6/1998 | Falk | ........................ 382/167 |
| 5,881,211 A | 3/1999 | Matsumura | |
| 6,008,907 A * | 12/1999 | Vigneau et al. | ............... 358/1.9 |
| 6,044,172 A | 3/2000 | Allen | |
| 6,268,939 B1 | 7/2001 | Klassen et al. | |
| 6,281,984 B1 * | 8/2001 | Decker et al. | ............... 358/1.9 |

(Continued)

FOREIGN PATENT DOCUMENTS

DE        43 05 693 C2    10/1993

(Continued)

OTHER PUBLICATIONS

Alfons Ritzer: "Color Management—kein Buch mit sieben Siegeln", [color management—no book with seven seals], Aktuell Nr. 28, München, Apr. 1997.

(Continued)

*Primary Examiner*—Kimberly Williams
*Assistant Examiner*—Michael Burleson
(74) *Attorney, Agent, or Firm*—Laurence A. Greenberg; Werner H. Stemer; Ralph E. Locher

(57) ABSTRACT

A method of producing from a first device-dependent image data set, a second image data set matched to a real process, includes, by using inverse gamut mapping, transforming color values from the first image data set into color values of a device-independent color space and, by using gamut mapping, transforming these device-independent color values into the second image data set of an output device; and a color management method including the producing method.

2 Claims, 2 Drawing Sheets

U.S. PATENT DOCUMENTS 6,330,078 B1 * 12/2001 Wang .................. 358/1.9
6,559,982 B1 * 5/2003 Gondek ................ 358/518
7,034,966 B1 * 4/2006 Kubo .................. 358/474

FOREIGN PATENT DOCUMENTS

| DE | 43 35 143 A1 | 1/1995 |
|---|---|---|
| EP | 0 475 554 A2 | 3/1992 |
| EP | 0 626 781 A2 | 11/1994 |
| EP | 0 659 322 B1 | 6/1995 |
| EP | 0 720 351 A2 | 7/1996 |
| EP | 0 750 419 A2 | 12/1996 |

OTHER PUBLICATIONS

Lindsay W. MacDonald: "Developments in colour management systems", Displays, vol. 16, No. 4, 1996, pp. 203-211.

* cited by examiner

COLOR MANAGEMENT METHOD

CROSS-REFERENCE TO RELATED APPLICATIONS

This is a divisional application of application Ser. No. 09/739,518, filed Dec. 15, 2000 now U.S. Pat No. 7,009,732; which claims the priority, under 35 U.S.C. §119, of German patent application No. 199 60 675.7, filed Dec. 15, 1999; the prior applications are herewith incorporated by reference in their entirety.

BACKGROUND OF THE INVENTION

Field of the Invention

The invention relates to a method of producing from a first device-dependent image data set, a second image data set matched to a real process, and a color management method for a printing process, wherein a device-independent image data set obtained from an original image is used to produce a first CMYB (cyan, magenta, yellow and black) image data set for a standard printing process, using a first transformation, and the first CMYB image data set is converted into a second CMYB image data set, which is matched to a real printing process, using a second transformation.

Such methods are needed in order to satisfy two conflicting requirements. On the one hand, it is of interest to print-job clients to be able to specify the desired printed result, in particular with regard to color reproduction, unequivocally in a manner which ensures that different printing operations deliver largely identical printed results. This means that the client must be in a position to specify color values to be achieved, not in an abstract manner, but rather, to specify directly the presettings of a printing machine with which the desired color values can be achieved. This necessarily presupposes a printing machine with a standardized behavior.

In contrast therewith is the problem that many printing plants do not operate in a standardized manner, and it is often inexpedient for them to operate in that manner because, sometimes, they can achieve better results for specific printing problems by deviating from the standard. It is obvious, however, that a non-standard printing machine will not deliver the result desired by the client by using presettings specified by a client, which are based upon a standard.

It is therefore important for the operator of the printing machine to know exactly the manner in which his machine deviates from the standard, so as to be able, accordingly, to convert the standard presettings into those suitable for his machine, which deliver the desired color reproduction.

For this purpose, it is necessary to print a test image by using the standard presettings in the real printing process of the non-standard machine, to compare the printed result with a predefined image and, by using this comparison, to determine a transformation rule which permits the standard presettings to be converted into those suitable for the real printing process.

Such a method has been developed by the Hell firm of Germany under the designation Pixon/PCT (programmed color transformation). This method is described, for example, in Häuser and Jung, "Pixon Verfahrenstechnik optimiert Reproduktionsanpassung an Druckbedingungen" (Pixon methodology optimizes the matching of reproduction to printing conditions), a special reprint from "Der Polygraph", 3-88.

The predefined image for comparison with the test image is, in this heretoforeknown method, a copy of the test image printed in accordance with the standard. This standard copy is the master to which the color reproduction of the real printing process is to be matched. This is effected by a percentage increase or reduction in the feed of individual printing inks, in order to match, in this manner, the color tones, saturation or lightness of the printed result to the original.

If these percentage relationships are known, they can be used during any desired subsequent print job in order to convert or transform the standard presetting values in such a manner that the correct color reproduction can be expected during the non-standard real printing process.

One problem with this heretoforeknown method is based upon the fact that the entire color space detectable by the human eye cannot be represented by a combined printing of the colors cyan, magenta, yellow and black in a given printing process. However, such color tones which cannot be represented may quite possibly be contained in an original image and, during the scanning of such an image, such color tones can be registered, and the parameters of such color tones can quite possibly be represented in a device-independent color space, in an RGB or Lab representation. When printing an image, the original of which contains such color tones, a given distortion of the color reproduction is therefore unavoidable. The simplest possibility would be to replace color tones, respectively, which cannot be represented in the CMYB system, by that color tone which can be represented and is closest in the RGB or Lab color space, and to reproduce all the other color tones faithfully. However, this solution is found to be unsatisfactory, because it identically reproduces in the reproduced image, color tones, which are different in the original. Information is therefore noticeably lost. Details of the defined or original image can no longer be seen in the printed image.

A different type of conversion, referred to as gamut mapping, of scanned data represented in the RGB or Lab system into the device-specific CMYB system is therefore widespread, wherein attention is given to faithful color reproduction only in a central area of the representable CMYB space and, in marginal areas, a deviating color reproduction is taken into consideration, wherein, however, to each color tone representable in the RGB or Lab system, a color tone in the CMYB space is uniquely assigned. This amounts to the device-independent RGB or Lab color tones in the central area being projected into the CMYB system "on a scale of 1:1", whereas in the marginal areas, a "smaller scale" is used.

The CMYB color space is, therefore, always only a subset of the RGB color space or the Lab color space. Added to this is the fact that the shape of this subset, respectively, depends upon the real printing process. Color tones which, in a first printing process, are located in the central area of the CMYB color space and can therefore be reproduced faithfully, can quite possibly be located in the marginal area or even outside the area which can be represented in a second printing process. The conventional color management method cannot take this into account. Because the comparison original is produced in the standard printing process, it necessarily cannot contain any color tones which cannot be represented in this process. However, it is entirely possible for some of the color tones represented to be located in the marginal area of the CMYB color space of the standard process and, therefore, to exhibit differences in tone with respect to an hypothetical original of the test image. In practice, this means that an original image is subject to a first color distortion and reduction in the color space during the conversion of the image data thereof from the RGB or Lab representation into CMYB data for the standard process, and goes through a second such distortion and reduction in the color space during the matching to the real printing process. The color space used after this matching is therefore not matched optimally to the capabilities of the real printing process and, in addition, sharp color differences can occur in the print in comparison with the original.

SUMMARY OF THE INVENTION

It is an object of the invention to provide a method of producing, from a first image data set, a second image data set matched to a real process, and a color management method which avoid the foregoing problem and achieve a desired printing quality as quickly as possible.

With the foregoing and other objects in view, there is provided, in accordance with one aspect of the invention, a method of producing from a first device-dependent image data set, a second image data set matched to a real process, which comprises, by using inverse gamut mapping, transforming color values from the first image data set into color values of a device-independent color space and, by using gamut mapping, transforming these device-independent color values into the second image data set of an output device.

In accordance with another mode of the method invention, the device-dependent image data sets are CMYB image data sets.

In accordance with a further mode, the method invention includes using a build-up of black in the first image data set for producing the second image data set.

In accordance with an added mode, the method invention includes analyzing the build-up of black in the first image data set, and using it in identical form for the production of the second image data set, if the first and the second devices are based upon identical processes.

In accordance with an additional mode, the method invention includes analyzing the build-up of black in the first image data set and, for the output in accordance with the boundary conditions of the second device, setting the black build-up to the limits of the second device, if a direct transfer is not possible because of the process.

In accordance with yet another mode of the method invention, the device-dependent image data sets are RGB image data sets.

In accordance with yet a further mode of the method invention, the device-independent image data sets are Lab image data sets.

In accordance with another aspect of the invention, there is provided a color management method for a printing process, which includes producing, from a device-independent image data set obtained from an original image, a first CMYB image data set for a standard printing process, by using a first transformation, and then producing a second CMYB image data set matched to a real printing process, by using a second transformation, which is determined by printing a test image, which comprises comparing the printed result with a predefinition, and optimizing the second transformation in order to minimize deviations between the printed result and the predefinition, the predefinition for the comparison being the device-independent image data set of the test image.

In accordance with a further mode, the color management method includes selecting the device-independent data set from the group consisting of an Lab and an RGB data set, respectively.

In accordance with a concomitant mode, the color management method includes producing a device-independent image data set from the printed result, and performing the comparison by using the device-independent data sets from the test image and the printed result.

Thus, the invention of the instant application proposes that the device-independent image data set from the test image be used as a predefinition or predefined image data set for the comparison. This device-independent data set can exhibit virtually any desired representation, provided this makes it possible to represent all the color tones which can be registered by the human eye or by a scanner. For example, an Lab or RGB representation can be used.

In order to perform the necessary comparison, a device-independent image data set from the printed result is expediently produced, and the comparison is performed by using the two device-independent image data sets, respectively, the image data set from the test image and the image data set from the printed result.

An important feature of the invention is that inverse gamut mapping is used to transform color values from a first image data set into color values of a device-independent color space, gamut mapping being used to transform these device-independent color values into a second image data set of an output device, such as a printer.

Other features which are considered as characteristic for the invention are set forth in the appended claims.

Although the invention is illustrated and described herein as a method of producing from a first image data set, a second image data set matched to a real process, and a color management method, it is nevertheless not intended to be limited to the details shown, since various modifications and structural changes may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
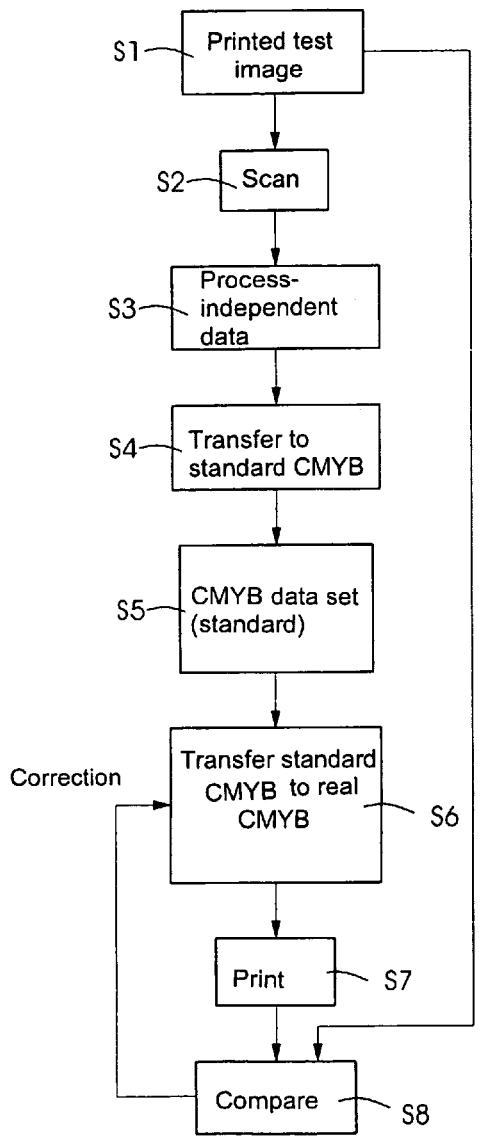
FIG. 1 is a flow chart showing, for purposes of comparison, the steps that are included in a conventional color management method.
Figure 2:
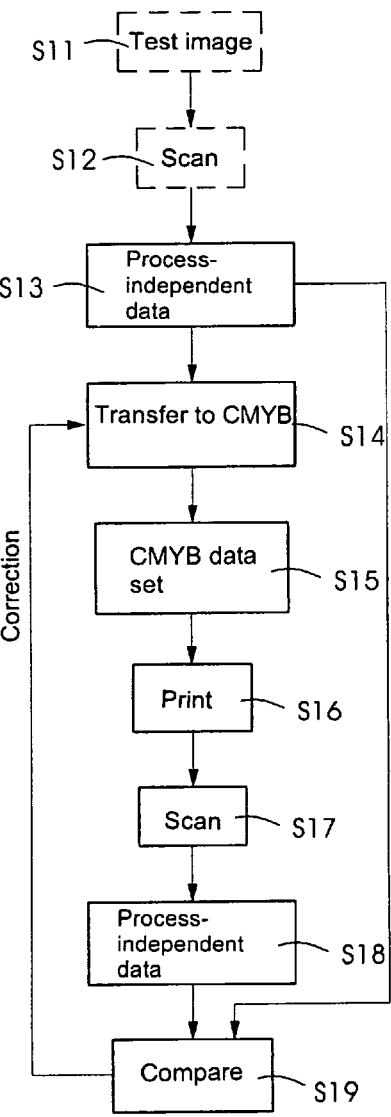
FIG. 2 is a flow chart showing the sequence of steps in the color management method according to the invention.

Referring now to the drawings, it is noted that the steps of a conventional color management method and of a color management method according to the invention, respectively, are summarized in FIGS. 1 and 2, mutually corresponding steps of both methods being illustrated in the two figures, respectively, at the same level on the first sheet of the drawings.

The starting point of the conventional method is the provision of a printed test image at step S1. This test image is scanned at S2, in order to obtain a data set which reproduces the entire image information in a process-independent or device-independent representation at step S3.

The method according to the invention essentially begins with the provision of a process-independent data set in step S13. The manner in which this data is obtained is unimportant; in the conventional method, it could be obtained by scanning a test image, as indicated by steps S11 and S12, shown in boxes formed by broken lines, but this test image does not have to be printed. It could also be a manually produced unique set. It would also be conceivable to produce the process-independent data set exclusively by CAD methods on a computer.

Conventionally, the process-independent data is converted, in a step S4, into a CMYB representation for the standard printing process.

In order to convert the data set provided at step S5 into a data set suitable for the real printing process, a transformation step S6 is necessary. Because this transformation presumptively is not known, during a first pass, step S6 is omitted; one could also speak of the standard CMYB data set being subjected to a unit transformation; and in step S7, printing is performed in accordance with this data set. A comparison, performed in step S8, between the printed result and the test image mentioned with reference to step S1 supplies information as to how the CMYB values must be changed, i.e., the form which the transformation in step S6 must have in order to arrive at a satisfactory color reproduction. The steps of transformation S6, S7 and comparison S8 may possibly be repeated many times, until a satisfactory transformation has been found. During subsequent print jobs, it is then sufficient only to perform the steps S2 to S6, in order to arrive at a suitable presetting for the print job.

In the method according to the invention, a transformation of the process-independent data into a CMYB representation is likewise performed in step S14. In this case, however, it does not necessarily always have to be a transformation into the CMYB representation for the standard process. The CMYB data set provided at S15 is used for printing at S16. The result is scanned at S17 in order to obtain a process-independent data set at S18. This process-independent data set, together with that from step S13, form the basis of a comparison step S19. Because this comparison is performed only on digitized data, it can advantageously be completely automated.

Differences between the two data sets permit conclusions to be drawn as to how the transformation step S14 has to be modified, if necessary, in order to improve the color reproduction. In this method, also, the sequence of steps S14 to S19 can be repeated many times until satisfactory agreement between the color reproduction and the predefinition is achieved.

When a usable transformation S14 has been determined in this manner, the printing machine can be preset quickly and simply in the case of an actual print job in that, starting from the process-independent data set from this original, the CMYB data set S15 for the real process is determined by the transformation determined in this manner.

Figure 3:
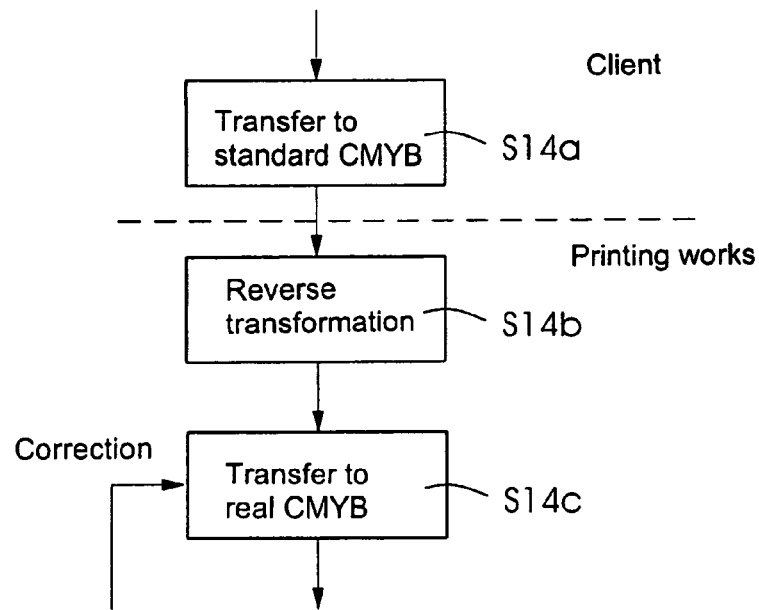
FIG. 3 is a flow chart showing a sequence of substeps of the step S14 of FIG. 2.

The transformation step S14 can include a combined computing step, which leads directly from the process-independent data set to the CMYB data set matched to the real printing process. The step can also be broken down, however, into a number of partial or substeps, as illustrated in FIG. 3. A first substep is a transformation S14a from the process-independent data set into the CMYB data set for the standard process, which can be performed by the print-job client. A further substep is a transformation in the opposite direction S14b. This can be performed, for example, by the printing plant. Because the transformed standard CMYB data set still contains the complete image information when gamut mapping is used, the transformation S14a is reversible, and because the gamut mapping by which the standard CMYB data is obtained is necessarily likewise standardized, the reversal can be performed in the printing plant, without requiring therefor any information from the client beyond the CMYB image data. A third substep is a transformation step S14c, which then converts the reproduced process-independent data set into a CMYB data set matched to the real printing process. During a first execution of the steps S13 to S19, this step S14c can be identical to step S14a; it is the transformation S14c which, respectively, is matched, based upon the result of the comparison S19.

We claim:

1. A color management method for a printing process, which comprises:
   carrying out the printing process by:
      producing, from a device-independent image data set obtained from an original image, a first CMYB image data set for a standard printing process, by using a first transformation; and
      then producing a second CMYB image data set matched to a real printing process, by using a second transformation, which is determined by printing a test image using the first CMYB image data set, and producing a device-independent image data set from the printed test image;
   comparing the device-independent image data set of the printed test image and the device-independent image data set of the original image; and
   optimizing the second transformation in order to minimize deviations between the printed image and the original image data.

2. The color management method according to claim 1, which includes selecting the device-incdependent data set from the group consisting of an Lab and an RGB data set, respectively.

* * * * *